United States Patent Office 2,706,185
Patented Apr. 12, 1955

2,706,185

SOLUTIONS OF ACRYLONITRILE POLYMERS IN SOLVENT MIXTURES COMPRISING A DIHYDRIC PHENOL AND A DICARBOXYLIC ACID OR ANHYDRIDE

Ernest Jan Kowolik, John Downing, and James Gordon Napier Drewitt, Spondon, near Derby, England, assignors to British Celanese Limited, a corporation of Great Britain No Drawing. Application February 19, 1952, Serial No. 272,517

Claims priority, application Great Britain March 2, 1951

12 Claims. (Cl. 260—29.6)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitrile, e. g. methacrylonitrile; vinyl esters, e. g. vinyl chloride and vinyl acetate; acrylic derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

U. S. Patent No. 2,679,492 describes the use of mixtures of nitromethane with a minor proportion of a compound containing two or more phenolic hydroxyl groups (referred to as a polyhydric phenol) as solvents for acrylonitrile polymers.

We have now found that acrylonitrile polymers can in general be dissolved in or swollen by mixtures of polyhydric phenols with organic compounds of higher molecular weight than nitromethane, which themselves possess some solvent or swelling action on polyacrylonitrile. We have moreover found that acrylonitrile polymers can be dissolved by mixtures of dihydroxy benzenes or dihydroxy lower alkyl benzenes (in which both hydroxyl groups are phenolic) with dicarboxylic acids containing 2–5 carbon atoms in the molecule or cyclic anhydrides of such acids, and also by mixtures of the same dihydric phenols with nitrosamines which themselves are capable of dissolving or swelling polyacrylonitrile. The mixtures may contain more than one phenolic and/or non-phenolic component. In this specification the term "polyhydric phenol" is employed to denote compounds containing two or more phenolic groups, and the term "lower alkyl benzene" to denote an alkylated benzene containing a total of not more than four alkyl carbon atoms in the alkyl groups, such as toluene, the xylenes, ethyl benzene and cumene.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvent mixtures than is polyacrylonitrile itself, and it will therefore be convenient in describing the invention in more detail to refer specifically to polyacrylonitrile.

Examples of dicarboxylic acids and cyclic anhydrides of dicarboxylic acids which may be used in accordance with the invention are oxalic acid, maleic acid, fumaric acid, succinic and glutaric acid, and maleic, succinic and glutaric anhydrides. Examples of nitrosamines which have a solvent or swelling action on polyacrylonitrile are given in British Patent No. 713,049; for the present purpose dimethylnitrosamine and N-nitroso-morpholine may be particularly mentioned.

Examples of other compounds which may be used in admixture with the polyhydric phenols are dimethyl formamide, dimethyl and methyl ethyl sulphones, dimethyl sulphoxide, sulpholane, lactones (e. g. butyrolactone and the valerolactones), cyclic carbonates (e. g. ethylene carbonate), nitro- and cyano-alcohols (e. g. nitroethanol, hydroxy-acetonitrile, ethylene cyanhydrin and alpha-hydroxy-propionitrile), m- and p-nitrophenol, nitriles of dibasic acids (e. g. malononitrile, fumaronitrile, succinonitrile, adiponitrile, and pimelonitrile), acetylacetone, and diketene.

Of the polyhydric phenols we prefer to use the dihydroxy-benzenes or dihydroxy lower alkyl benzenes in which both the hydroxyl groups are phenolic, the most useful being the dihydroxy-benzenes and -toluenes. Those dihydric phenols in which the hydroxyl groups are arranged asymmetrically with respect to the centre of the benzene nucleus are generally more effective than those in which the arrangement is symmetrical. Thus resorcinol and catechol are better for the present purpose than hydroquinone; and homocatechol, 2-methyl-resorcinol and orcinol are better than 2-methyl-hydroquinone. Tri-hydroxy compounds appear to have somewhat less effect than dihydroxy compounds, and mixtures comprising tri-hydroxy-benzenes are in many cases strong swelling agents rather than true solvents. It may be noted that the dihydroxy-benzenes and their homologues in which the hydroxyl groups are asymmetrically arranged, and which are most suitable for the purpose of the invention, are more soluble in water and have considerably lower melting points than those in which the hydroxyl groups are symmetrically arranged.

The solvent and swelling mixtures of the invention may be anhydrous or may contain a proportion of water. For example mixtures comprising maleic acid and resorcinol or catechol appear to have their greatest power of dissolving acrylonitrile polymers when they are substantially free from water, quite small amounts of water tending to give a grainy solution. On the other hand the solvent power of mixtures of oxalic acid and polyhydric phenols is greatly increased by the presence of water, for example in amount about 10–30% by weight of the mixture; thus good solvent mixtures can be obtained from oxalic acid dihydrate and resorcinol or catechol or another di-hydric phenol.

The solvent or swelling mixtures may comprise between 5 and 95% of the polyhydric phenol. For some purposes however it is desirable not to employ a high proportion of the phenol, as in high concentration it may tend to crystallise out at temperatures below about 50° C. Even when the phenol is present in quite a minor proportion it frequently has a very large effect on the solvent power of the mixture. For example maleic acid by itself is not a satisfactory solvent for polyacrylonitrile, but when mixed with only 10% of catechol it becomes so. As a rule the most satisfactory solutions are obtained using mixtures containing between 5 and 25% of the phenol. Examples of useful solvent mixtures are:

Maleic acid or anhydride, 90 parts by weight
Resorcinol, catechol or hydroquinone, 10 parts by weight Oxalic acid (dihydrate), 80–90 parts by weight
Resorcinol or catechol, 20–10 parts by weight Dimethylnitrosamine or N-nitrosomorpholine, 90 parts by weight
Resorcinol or catechol, 10 parts by weight Succinic anhydride, 50–90 parts by weight
Resorcinol or catechol, 50–10 parts by weight Examples of solvent compositions containing the phenol as the main component are:

Maleic anhydride, 15 parts by weight
Resorcinol or phloroglucinol, 85 parts by weight Maleic anhydride, 35 parts by weight
Catechol, 65 parts by weight The polyacrylonitrile may be dissolved in the new solvent mixtures at elevated temperatures, in particular at temperatures between 100° and 150° C.; the solutions once formed can usually be cooled to a considerable degree, in some cases even to room temperature, without immediate gelling. The temperature at which solution occurs will vary to some extent with the particular solvent mixture used. Thus for example a mixture of oxalic acid dihydrate and resorcinol containing 10–20% by weight of resorcinol will dissolve polyacrylonitrile at 110°–130° C., while a similar solvent mixture in which catechol replaces the resorcinol requires a temperature of about 130°–140° C. Mixtures comprising maleic acid (about 90% by weight) and resorcinol or catechol (about 10% by weight) usually require a temperature of about 140° C., while with mixtures comprising maleic anhydride instead of maleic acid somewhat lower temperatures are suitable. Mixtures of maleic anhydride and resorcinol, catechol or phloroglucinol in which the phenol is the predominating constituent, amounting for example to between about 60% and 90% by weight of the mixture, will dissolve polyacrylonitrile at temperatures of about 100°–110° C., but the solutions obtained are rather strongly coloured, and tend to deposit crystals on cooling.

To dissolve the polyacrylonitrile, the polymer in a finely divided form such as a powder, or in the form of filaments, ribbons or the like, may be added to the solvent mixture at or near room temperature, and the mixture then heated, preferably with stirring, to the solution temperature. Alternatively, the polymer may be added to the solvent mixture at an elevated temperature which may be lower than or equal to that at which solution is to be effected, or it may be heated with one or other of the components of the solvent mixture to a temperature in the neighbourhood of that at which solution is to be effected, and the second component then mixed in. Once formed, the solutions can be cooled to varying degrees without causing them to gel, although their viscosities naturally rise as the temperature falls.

When the solutions are to be used for the production of one- or two-dimensional shaped articles, such as fibres or films, by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5%–20%, concentrations of 10%–20% being particularly useful.

The shaped articles may be made by wet-spinning methods, preferably using as the coagulating liquid an aromatic hydrocarbon or a halogenated hydrocarbon as described in British Patent No. 711,344, or, better still, a carboxylic ester of boiling point above 250° C., especially di-alkyl phthalate, as described in British Patent No. 712,894. It is usually preferable that the spinning solution should be at an elevated temperature, especially between about 60° and 100° or 120° C., and that the coagulating liquid also should be heated to a temperature within this range.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example the fibres, after leaving the coagulating bath, may be wound up and washed (e. g. in the form of multi-filament yarns), and then stretched while heated; for example they may be stretched in hot air, wet steam, or water at a temperature above 80° C. as described in British Patent No. 636,476, or while they are passed in contact with hot metal surfaces, e. g. the surface of a plate or roller kept at about 120°–150° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C., as described in British Patent No. 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

It has already been stated that the invention may be applied to the production of solutions not only of polyacrylonitrile itself, but also of copolymers of acrylonitrile. For example, it may be applied to the production of solutions of copolymers of acrylonitrile with methacrylonitrile, vinyl chloride or vinyl acetate, acrylic acid derivatives such as methyl or phenyl acrylate, styrene or a derivative thereof, or vinylidene chloride, in which the proportion of acrylonitrile is greater than 85%, for example between about 90 and 95%.

The invention is illustrated by the following examples. All "parts" and proportions are by weight.

*Example I*

100 parts of polyacrylonitrile having a viscosity (in 1% dimethyl formamide solution at 20° C.) of 3.2 centistokes and made by polymerising acrylonitrile in about 18 times its weight of water using ammonium persulphate as catalyst, was added to 600 parts of a mixture consisting of 90% of maleic acid and 10% of catechol, and the mixture heated with stirring to 140° C. until a clear solution had been formed. This solution was converted into fibres by extrusion at 95° C. into a bath of dibutyl phthalate at 80° C.

*Example II*

100 parts of the polyacrylonitrile employed in Example I was added to 700 parts of a mixture consisting of 85% of oxalic acid dihydrate and 15% of resorcinol, and the mixture heated to 120° C. until a clear solution had been formed. This solution was converted into fibres by extrusion at 85° C. into a bath of dibutyl phthalate at 80° C.

*Example III*

100 parts of the polyacrylonitrile employed in Example I was added to 700 parts of a mixture consisting of 90% of dimethylnitrosamine and 10% of resorcinol, and the mixture heated to about 140° C. until a clear solution had been formed. This solution was converted into fibres by extrusion at 100° C. into a bath of dibutyl phthalate at 80° C.

Having described our invention, what we desire to secure by Letters Patent is:

1. Compositions comprising an acrylonitrile polymer containing at least 85% by weight of acrylonitrile dissolved in a solvent mixture comprising 5 to 95% by weight of a dihydric phenol containing at most seven carbon atoms and 95 to 5% by weight of a compound selected from the group which consists of dicarboxylic acids containing 2 to 5 carbon atoms in the molecule and cyclic anhydrides of such acids.

2. Compositions according to claim 1, wherein the hydroxyl groups in the dihydric phenol are arranged asymmetrically with respect to the centre of the benzene nucleus.

3. Compositions according to claim 1, wherein the concentration of the polymer in the solution is 5 to 25%.

4. Compositions according to claim 1, wherein the concentration of the dihydric phenol in the solvent mixture is 5 to 25%.

5. Compositions comprising a fibre-forming acrylonitrile polymer containing at least 85% by weight of acrylonitrile dissolved in 3 to 19 times its weight of a solvent mixture of maleic acid and resorcinol containing 5 to 25% by weight of resorcinol.

6. Compositions comprising a fibre-forming acrylonitrile polymer containing at least 85% by weight of acrylonitrile dissolved in 3 to 19 times its weight of a solvent mixture of maleic acid and catechol containing 5 to 25% by weight of catechol.

7. Compositions comprising a fibre-forming acrylonitrile polymer containing at least 85% by weight of acrylonitrile dissolved in 3 to 19 times its weight of a solvent mixture of oxalic acid, water and resorcinol containing 5 to 25% by weight of resorcinol, and 10 to 30% by weight of water.

8. Compositions comprising a fibre-forming acrylonitrile polymer containing at least 85% by weight of acrylonitrile dissolved in 3 to 19 times its weight of a solvent mixture of oxalic acid, water and catechol containing 5 to 25% by weight of catechol, and 10 to 30% by weight of water.

9. Compositions comprising a fibre-forming acrylonitrile polymer containing at least 85% by weight of acrylonitrile dissolved in 3 to 19 times its weight of a solvent mixture of oxalic acid dihydrate and resorcinol containing 10 to 20% by weight of resorcinol.

10. Compositions comprising a fibre-forming acrylonitrile polymer containing at least 85% by weight of acrylonitrile dissolved in 3 to 19 times its weight of a solvent mixture of oxalic acid dihydrate and catechol containing 10 to 20% by weight of catechol.

11. Compositions comprising a fibre-forming acrylonitrile polymer containing at least 85% by weight of acrylonitrile dissolved in 3 to 19 times its weight of a solvent mixture of succinic anhydride and resorcinol containing 10 to 50% by weight of resorcinol.

12. Compositions comprising a fibre-forming acrylonitrile polymer containing at least 85% by weight of acrylonitrile dissolved in 3 to 19 times its weight of a solvent mixture of succinic anhydride and catechol containing 10 to 50% by weight of catechol.

References Cited in the file of this patent

UNITED STATES PATENTS

| | | |
|---|---|---|
| 2,492,419 | Galyer | Dec. 27, 1949 |
| 2,570,257 | McFarren | Oct. 9, 1951 |
| 2,607,751 | Flanagan | Aug. 19, 1952 |